United States Patent [19]
Worley

[11] 3,971,138
[45] July 27, 1976

[54] ADJUSTABLE MOLDING SYSTEM
[76] Inventor: Paul J. Worley, Box 23, Alto, Ga. 30510
[22] Filed: Aug. 7, 1975
[21] Appl. No.: 602,901

[52] U.S. Cl. .......................... 33/174 L; 33/174 PA; 33/176; 425/317
[51] Int. Cl.² ...................... G01B 5/00; G01B 5/20; B29C 23/00
[58] Field of Search ........... 33/174 L, 174 G, 174 P, 33/174 PA, 1 K, 1 V, 176; 425/317

[56] References Cited
UNITED STATES PATENTS

| | | | |
|---|---|---|---|
| 2,231,432 | 2/1941 | Wilczek | 33/174 G |
| 3,895,446 | 7/1975 | Orlov et al. | 33/174 PA |

FOREIGN PATENTS OR APPLICATIONS

| | | | |
|---|---|---|---|
| 1,812,927 | 6/1970 | Germany | 33/174 PA |
| 794,985 | 5/1958 | United Kingdom | 33/174 P |

*Primary Examiner*—Richard E. Aegerter
*Assistant Examiner*—Richard R. Stearns

[57] ABSTRACT

For producing a copy in settable material such as plastic of an object, for example for repairing one side of a vehicle such as an automobile, truck or boat to correspond to the shape of the other side, a tracer mechanism is provided which is secured on one side and a copying mechanism on the other side, the two being connected by a plurality of flexible tubes. On the tracer side there is a frame on which is longitudinally slidable a carrier in which is secured a tube with a piston slidable therein, and a support connected to the piston. Secured at their ends in the support and slidable through openings in the carrier are a plurality of tubes, in each of which is slidable a piston connected to a spline which extends below the support. The free ends of the splines carry a shaping member formed of flexible material. The support on the tracer side is provided with wheels which roll on the surface to be copied.

On the copy side, there is likewise a frame on which a carrier is slidable, the other end of the support tube being secured in this carrier and being connected to a support through a reversing mechanism. Likewise, the spline tubes pass slidably through the carrier and their ends are connected to the support. On the copy side, there is likewise a flexible shaping member connected to the ends of the splines which are in themselves connected through the reversing mechanism to the pistons in the spline tubes.

Arrangements such as suction cups are provided for mounting the frames on the tracer and copy sides.

6 Claims, 11 Drawing Figures

ADJUSTABLE MOLDING SYSTEM

BACKGROUND OF THE INVENTION

1. Field of the Invention

The invention relates to an apparatus for shaping and finishing plastic fillers and other similar settable materials, and for copying a pattern.

2. The Prior Art

In the usual practice of copying shapes, for example in repairing dents or holes in the body work of automobiles, boats, aircraft, trucks or the like, the usual practice is to mash out the dents as closely as possible with a hammer to the proper shape, and thereafter to fill in any recesses and to bring them to the proper shape by cutting, grinding or sanding. This involves a considerable loss of material, and produces a great deal of dust which is of course unhealthy. Also, it is hard to produce an exact copy by hand, and the work involved is quite expensive.

SUMMARY OF THE INVENTION

The present invention relates to an apparatus for producing a copy, either on the same scale or on a changed scale, from a tracer part or pattern, by applying to the copy side a paste or putty-like plastic material and smoothing out this material accurately to the proper shape by moving an element along the tracer side and correspondingly on the copy side.

According to the invention, there are provided frames for both the tracer side and the copy side on which carriers are slidable. The various elements on the tracer side and the copy side are connected by a plurality of flexible pipes, which may for example be laid over the top of an automobile or other vehicle. On the tracer side, there is a tube which is secured to the carrier and in which is slidable a piston connected to a support. Wheels are provided on the support for rolling on the surface on the tracer side and tilting the support in accordance with variations in the angle of the surface of this side.

Spline tubes are also provided extending across the frame, these tubes having their ends secured in the support and having pistons therein with splines extending downwardly therefrom and connected to a flexible shaping member.

On the copy side, there is also provided a support tube secured in the carrier. A piston slidable in the tube is connected through a reversing mechanism to a support. The spline tubes pass slidably through the frame on the copy side and contains pistons, the piston rods of which are connected through reversing mechanisms to splines which in turn carry at their ends a shaping member.

A tubular connection is also provided by which the movement of the carrier on the tracer side along the frame is transmitted equally and in the same direction to the carrier on the copy side.

BRIEF DESCRIPTION OF THE DRAWINGS

The invention will be now explained in connection with the accompanying drawings, in which.

DESCRIPTION OF THE PREFERRED EMBODIMENTS

Figure 1:
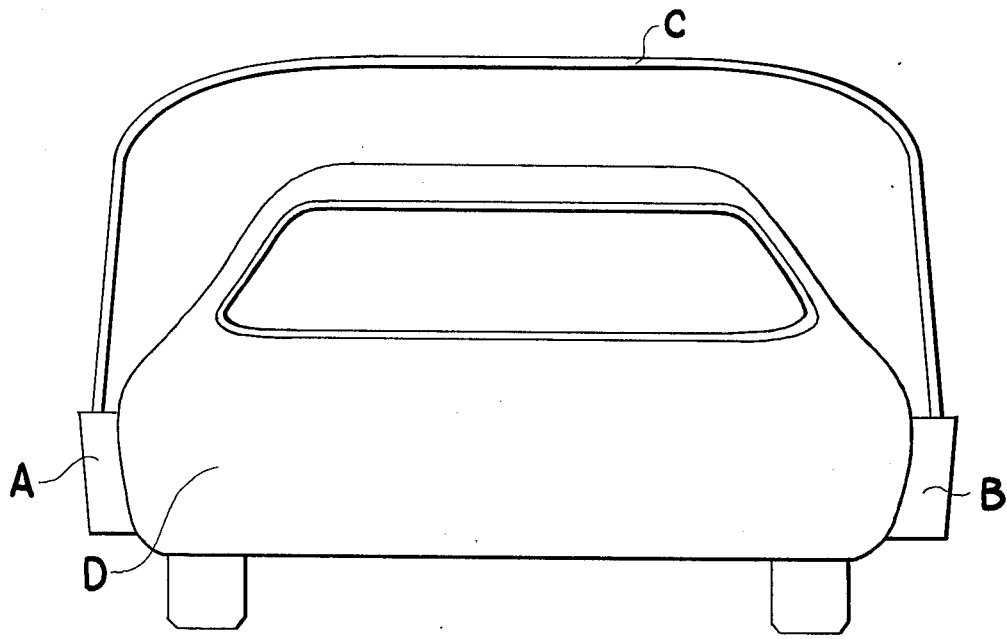
FIG. 1 shows in end view schematically a vehicle in which the invention is being used for repairing a piece of body on one side.
Figure 2:
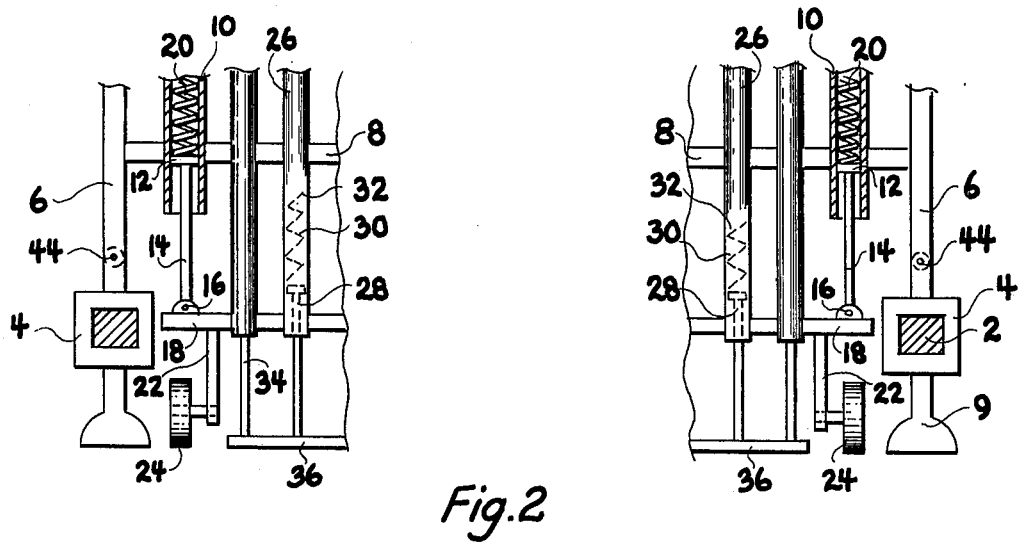
FIG. 2 is a view in cross-section on the line 2—2 of FIG. 3 of the mechanism on the tracer side.
Figure 3:
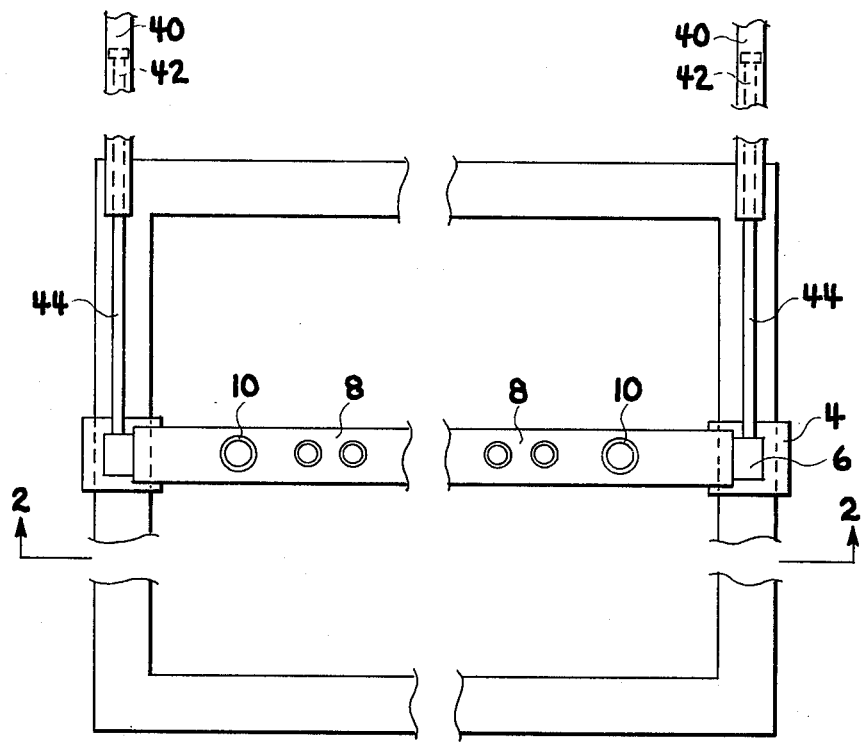
FIG. 3 is a top plan view of the mechanism of FIG. 2.
Figure 4:
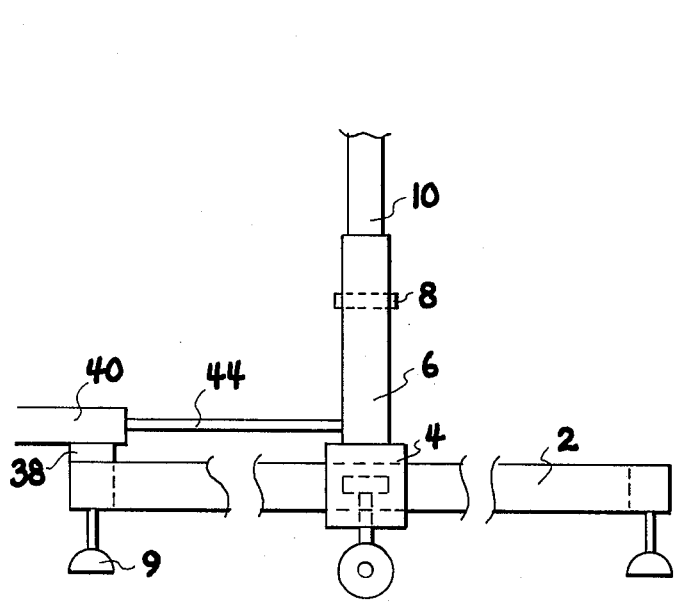
FIG. 4 shows in side elevation the mechanism of FIG. 2.
Figure 7:
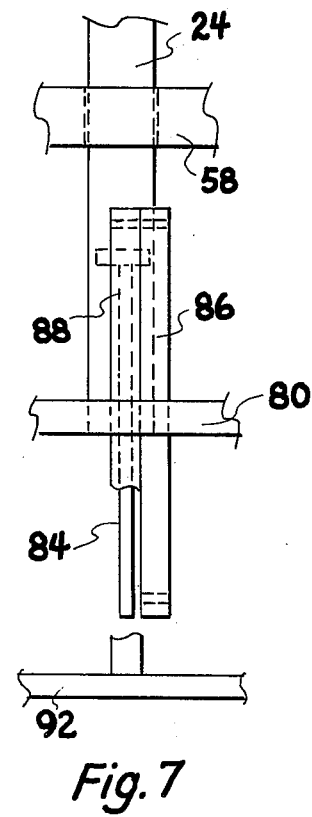
FIG. 7 is an enlargement of a portion of FIG. 5.
Figure 5:
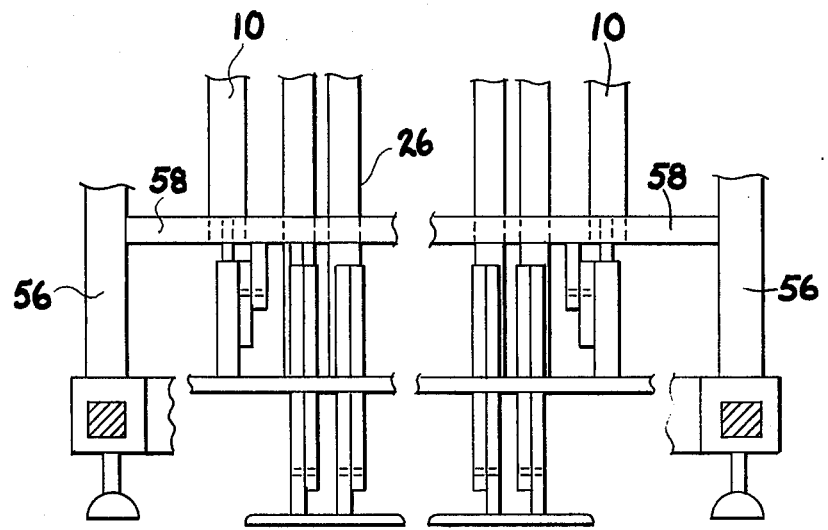
FIG. 5 shows in cross-section on the line 5—5 of FIG. 6 the mechanism on the copy side.
Figure 6:
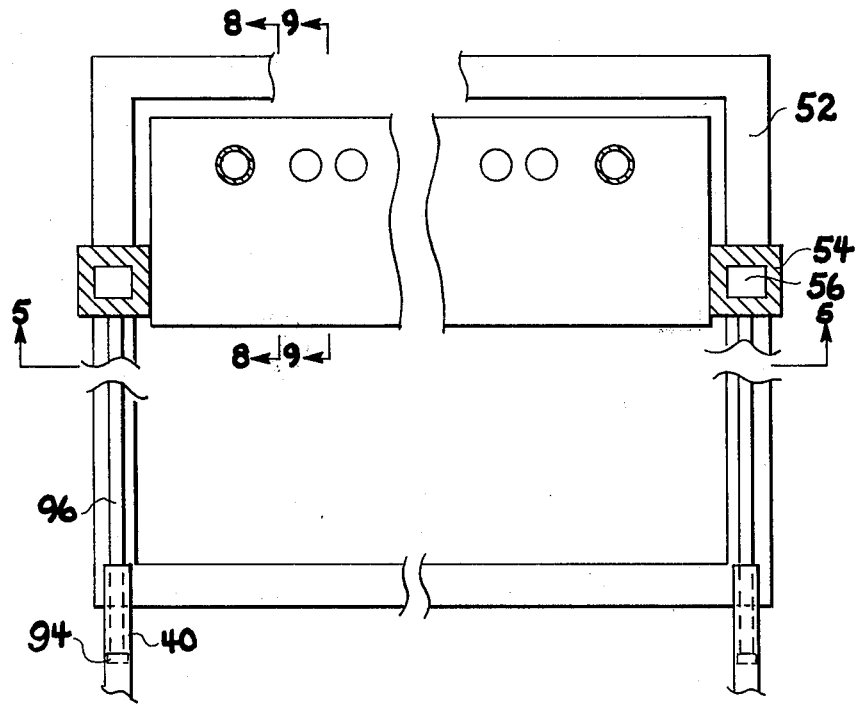
FIG. 6 is a top plan view of the mechanism of FIG. 5.

The mechanism as shown in FIG. 1 includes a tracer mechanism A to be described in more detail in connection with FIGS. 2 to 4 and a copying mechanism B to be described in connection with FIGS. 5 to 9, these being connected by a plurality of tubes indicated at C running from one side to another, for example, of a motor vehicle indicated at D.

The tracer mechanism A includes a rectangular frame 2 along the sides of which are slidable a plurality of sleeves 4 with upright members 6, between which is secured a cross-piece 8, these parts constituting a carrier slidable longitudinally on the frame 2.

In each end of the cross-piece 8 are secured tilt-producing flexible pipes or tubes 10, in which are slidable pistons 12 with piston rods 14 connected pivotally at 16 to a support 18. A coil spring 20 is arranged in the hose 10 for urging the piston downwardly. Fixed to the support 18 are legs 22 which at the lower ends carry rotating rollers 24. The frame is provided with arrangements for securing it on the side of a vehicle, such as suction cups 9.

A plurality of spline tubes 26 arranged side by side across the width of the support tube 18 have their lower ends secured in the support while their upper parts slide through the cross-piece 8. Arranged in these spline tubes are pistons 28 urged outwardly therefrom by springs 30 supported by cross pins 32. Splines 34 extend from the pistons 28 out below the lower ends of the spline tubes and their ends are connected to a flexible shaping member 36, formed for example of a relatively flexible plastic material and connected on the ends of spline tubes. Mounted by brackets 38 at one end of the frame 2 are motion transmitting tubes 40, in which are arranged pistons 42, the piston rods 44 of which are connected to the uprights 6.

Referring now to FIGS. 5 to 9, on the copy side there is a rectangular frame 52 on which are slidable sleeves 54 carrying uprights 56 between which is mounted a cross-piece 58, these parts constituting the carrier on the copy side. The tilt-producing tubes 10 have their other ends secured in the cross-piece 58 and there is in each tube a piston 60 with a piston rod 62. The lower end of the piston rod 62 has a head 64 with a slot 66 therein, in which is slidable a pin 68 carried by a lever 70 pivoted at 72 on a bracket member 74 carried by the cross-piece 58. The other end of the lever 70 has a pin 76 engaged in a slot in a link 78 which is also pivotally connected to a support 80.

The spline tubes 26 are slidable in the cross-piece 58 and their free ends are secured in the support 80. The pistons 82 are connected to piston rods 84, which, by a similar pin and slot connection, are connected to a lever 86 connected at its other ends to splines 88 which are slidable through the support 80, the lever 86 being pivoted at 90 in a slot in the support 80. The splines 88 carry at their lower end a shaping member 92 of flexible material.

The displacing movement tube 40 is connected to the frame 52 on the opposite end from the end at which it is connected to the frame 2, and contains a piston 94 with a piston rod 96 connected to the upright 56 of the carrier.

OPERATION

In order to use the device, the frame 2 is fixed on an undamaged side of the vehicle, by the suction cups, while the frame 62 is similarly secured on the side to be repaired or copy side. The side to be repaired, after as much as possible of the damage has been eliminated by hammering or other modification of the shape, is spread with a paste-like plastic, such as a polyester base plastic filler. The carrier 4, 6 is started at one end of the area to be copied and moved along the frame 2, thus moving with it the piston rod 44 and displacing in one direction or another the liquid contained in the displacing tube 40. This movement is transmitted to the carrier 54, 56 on the copy side, and because of the reversal of the pipes, the movement will be in the same direction on the copy side as on the tracer side.

Figure 8:
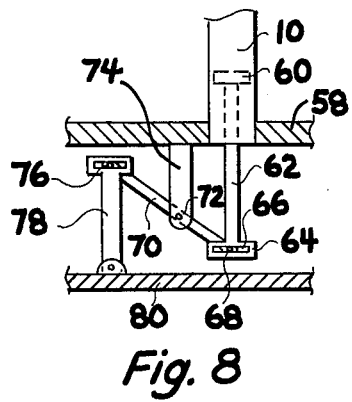
FIG. 8 is a cross-section on the line 8—8 of FIG. 6.

As the frame on the tracer side moves along the frame, the wheels 24 will impart tilt to the support 18, corresponding to any tilting of the surface on the tracer side with respect to the frame, and this movement will be impaired to the liquid in the tilting hose 10, which in turn through the reversing mechanism shown in FIG. 8 will produce the same tilting movement on the copy side.

As the shaping member 36 on the tracer side moves along the surface, it will be pushed against the surface and will follow the contours thereof by reason of the springs 30 acting on the splines 34. As each spline is pushed a certain distance into the spline tube, it will displace the liquid in the spline tube and, through the reversing mechanism shown in FIG. 9, will produce the same movement of the spline and therefore of the shaping member 92 on the copy side. Thus the paste or putty-like product on the copy side will have substantially the exact shape of the tracer side, and can then be treated by ultraviolet or heat to set it and be of the proper contour with substantially no further treatment.

Figure 10:
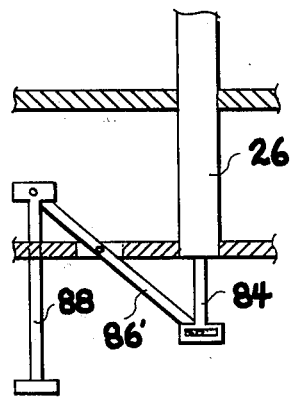
FIG. 10 shows a cross-section of a modification of the invention.
Figure 11:
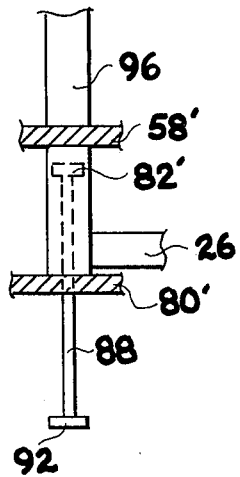
FIG. 11 shows a view similar to FIG. 9 of a further modification.

It may be desirable in some instances, for example when it is desired to copy a template on a different scale, to move the spline on the copy side by proportionally different distances from those on the tracer side. This may be accomplished, as shown in FIG. 10, by making the arms of the lever 86' unequal, so that the spline 88 moves by a greater or lesser distance than the piston rod 84.

Figure 9:
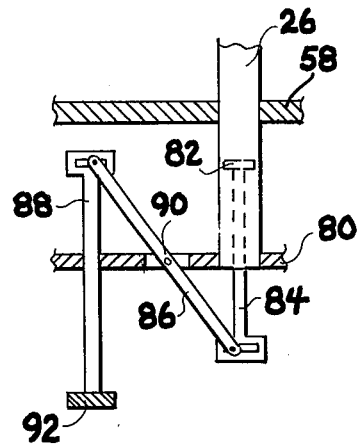
FIG. 9 is a cross-section on the line 9—9 of FIG. 6.

In order to produce the reversal of the movement of the splines without using the reversing mechanism of FIG. 9, the spline tubes 26 may be connected to the bottom ends of tubes 96 slidable in a cross-piece 58', and fixed in a support 80', with pistons 82' connected to splines 88. In this case, the tubes 96 are slightly larger than the spline tubes 26, so that the exposed bottom cross-section of piston 82' is equal to the cross-section of piston 28.

It is obvious that, by changing the cross-section of tubes 96, a variation in the ratio of transmission of movement, and thus a similar variation in the ratio of the pattern to the finished product can be obtained.

What is claimed is:

1. An adjustable molding system comprising a tracer mechanism and a copy mechanism, the tracer mechanism comprising a first frame defining a plane and having transverse and longitudinal directions, a first carrier, means mounting the first carrier for longitudinal sliding movement on the frame, a plurality of tracer splines, means slidably mounting said tracer splines on said first carrier for sliding movement transversely to the plane of the frame, said tracer splines being arranged side-by-side transversely of the frame, a tracer-shaping member of flexible material secured on the ends of the splines, the copy mechanism comprising a second frame defining a plane and having transverse and longitudinal directions, a second carrier, means mounting the second carrier for movement longitudinally of said second frame, a plurality of copy splines corresponding in number to said plurality of tracer splines on the copy side, means mounting said copy splines on said second carrier for sliding movement transversely to the plane of the second frame, said copy splines being arranged side-by-side transversely of the second frame, a copy-shaping member of flexible material secured on the ends of the copy splines remote from the carrier, first transmitting means responsive to longitudinal sliding movement of the first carrier to produce movement of the second carrier longitudinally of the second frame along the second frame in the same direction, and second transmitting means responsive to the movement of each of the tracer splines to move a corresponding one of the copy splines by a proportionally equal amount in the same direction with respect to the second frame.

2. The device as claimed in claim 1, wherein said second transmitting means comprises a plurality of spline tubes extending from the tracer mechanism to the copy mechanism, pistons slidably carried in said tubes on the side of the tracer mechanism and being connected to the tracer splines, and pistons slidably carried in said spline tubes on the side of the copy mechanism, and means operatively connecting the pistons on the copy mechanism side of the tubes to the copy splines to impart movement to the copy splines in the same direction with respect to said second carrier as the movement of the tracer splines with respect to said first carrier.

3. The device as claimed in claim 2, wherein said last means comprises means for reversing the direction of motion of said pistons on the copy mechanism side of the said tubes.

4. The device as claimed in claim 2, including a first support in the tracer mechanism, said spline tubes having their first ends secured in said first support and means slidably mounting the spline tubes in said first carrier, means positioning said first support a predetermined distance from the surface of an article on which said first frame is mounted, said last means being engageable with the article, a second support in the copy mechanism, said spline tubes having their other ends secured in said second support and means mounting said other ends of the spline tubes slidably in said second carrier, and means operatively connecting the first support and the second support to impart to the second support motions proportional to motions of the first support with respect to the first carrier and in the same direction with respect to the second carrier as the direction of motions of the first support with respect to the first carrier.

5. The device as claimed in claim 4, in which said last means comprises flexible support tubes secured in said first and second carriers, support pistons in said support tubes, and means operatively connecting said support pistons to said supports.

6. The device as claimed in claim 5, wherein said last means in the copy mechanism comprises means for reversing the direction of motion of said support pistons on the copy mechanism side of said support tubes.

* * * * *